US012040611B2

(12) United States Patent
Hall et al.

(10) Patent No.: US 12,040,611 B2
(45) Date of Patent: Jul. 16, 2024

(54) DATA CENTER ENERGY MANAGEMENT SYSTEM USING AN ENERGY FLOW CONFIGURATION

(71) Applicant: Equinix, Inc., Redwood City, CA (US)

(72) Inventors: David James Asher Hall, London (GB); Tikhon Suresh Pichai, Simpsonville, SC (US); Craig Pennington, Sunnyvale, CA (US); Robert W. Salter, Novato, CA (US); Chad McCarthy, Frankfurt am Main (DE)

(73) Assignee: Equinix, Inc., Redwood City, CA (US)

( * ) Notice: Subject to any disclaimer, the term of this patent is extended or adjusted under 35 U.S.C. 154(b) by 387 days.

(21) Appl. No.: 16/732,131

(22) Filed: Dec. 31, 2019

(65) Prior Publication Data

US 2021/0021126 A1 Jan. 21, 2021

Related U.S. Application Data

(60) Provisional application No. 62/876,475, filed on Jul. 19, 2019.

(51) Int. Cl.
*H02J 3/00* (2006.01)
*G06N 20/00* (2019.01)
(Continued)

(52) U.S. Cl.
CPC .............. *H02J 3/003* (2020.01); *G06N 20/00* (2019.01); *G06Q 10/06315* (2013.01);
(Continued)

(58) Field of Classification Search
None
See application file for complete search history.

(56) References Cited

U.S. PATENT DOCUMENTS 10,432,017 B1 * 10/2019 Morales .............. H02J 7/00712
2013/0253716 A1    9/2013 Gross et al.
(Continued)

FOREIGN PATENT DOCUMENTS

EP    3247016 A1    11/2017
WO   2014130972 A1   8/2014

OTHER PUBLICATIONS

International Search Report and Written Opinion of International Application No. PCT/US2020/042491 on Nov. 2, 2020, 15 pp.
(Continued)

*Primary Examiner* — Mohammad Ali
*Assistant Examiner* — Saad M Kabir
(74) *Attorney, Agent, or Firm* — Shumaker & Sieffert, P.A.

(57) ABSTRACT

This disclosure describes techniques that include managing flows of energy within a system that includes a data center and using at least some of the energy flows to provide power to the data center. In some examples, this disclosure describes a system comprising a power generation system, a battery storage system having a state of charge attribute, and processing circuitry having access to an electrical power grid, the power generation system, and the battery storage system. In one example, the processing circuitry is configured to: determine an energy utilization forecast for a data center; monitor energy availability factors; and determine, based on the energy utilization forecast and the monitored energy availability factors, an energy flow configuration defining energy flows involving with the electrical power grid, the power generation system, the battery storage system, and the data center.

19 Claims, 4 Drawing Sheets

(51) Int. Cl.
G06Q 10/0631 (2023.01)
H02J 3/32 (2006.01)
H02J 9/06 (2006.01)
G06Q 50/06 (2012.01)

(52) U.S. Cl.
CPC ............... *H02J 3/32* (2013.01); *H02J 9/068* (2020.01); *G06Q 50/06* (2013.01)

(56) References Cited

U.S. PATENT DOCUMENTS

| | | | | |
|---|---|---|---|---|
| 2014/0070617 | A1* | 3/2014 | Detmers | H02J 3/00 307/64 |
| 2014/0101462 | A1 | 4/2014 | Rose et al. | |
| 2015/0214771 | A1* | 7/2015 | Peterson | G06F 1/263 307/20 |
| 2018/0052431 | A1 | 2/2018 | Shaikh et al. | |
| 2019/0067951 | A1 | 2/2019 | Shoemaker | |
| 2019/0302706 | A1* | 10/2019 | Curtis | G05B 13/026 |

OTHER PUBLICATIONS

Florida, R, "Data driven modeling and estimation of lithium-ion battery properties," Phys.Org, Technology, Energy & Green Tech, Mar. 2019, 3 pp. retrieved from https://phys.org/news/2019-03-data-driven-lithium-ion-battery-properties.html on Jun. 11, 2020.

Harris, S., "Microsoft Reinvents DataCenter Power Backup with New Open Compute Project Specification," Microsoft Datacenters Blog, Mar. 10, 2015, 7 pp. retrieved from https://docs.microsoft.con/en-us/archieve/blogs/msdatacenters/microsoft-reinvents-datacenter-power-backup-with-new-open-compute-project-specification on Jun. 11, 2020.

Kassner, M., "Tesla's Powerpack proposes battery power for data centers," Data Center Dynamics Ltd., May 18, 2015, 7 pp. retrieved from https://www.datacenterdynamics.com/en/analysis/teslas-powerpack-proposes-battery-power-for-data-centers/ on Jun. 16, 2020.

McCluer, S., "Battery Technology for Data Centers and network Rooms: Lead-Acid Battery Options," White Paper 30, Revision 12, Schneider Electric, Data Center Science Center, Apr. 2010, 9 pp.

Nasiriani et al., "Optimal Peak Shaving Using Batteries at Datacenters: Characterizing the Risks and Benefits," 2017 IEEE 25th International Symposium on Modeling, Analysis, and Simulation of Computer and Telecommunication Systems (MASCOTS), Sep. 2017, 11 pp.

Pries, et al., "Power Consumption Analysis of Data Center Architectures," In Rodriques J.J.P.C., Zhou L., Chen M., Mailas A. (eds) Green Communications and Networking. GreeNets 2011. Lecture Notes of the Institute for Computer Sciences, Social Informatics and Telecommunications Engineering, vol. 51, Jan. 2012, 11 pp.

Shanley, N., "Boosting UPS Performance with Lithium-ion Technology," Data Center Knowledge, Oct. 4, 2018, 6 pp. retrieved from https://www.datacenterknowledge.com/industry-perspectives/boosting-ups-performance-lithium-ion-technology on Jun. 16, 2020.

Shi et al., "Leveraging energy storage to optimize data center electricity cost in emerging power markets," e-Energy '16: Proceedings of the Seventh International Conference on Future Energy Systems, Article 18, Jun. 2016, 13 pp.

Storrow, B., "How Big Batteries at Data Centers Could Replace Power Plants," E&E News, Jul. 19, 2018, 9 pp. retrieved from https://www.scientificamerican.com/article/how-big-batteries-at-data-centers-coul-replace-power-plants/ on Jun. 11, 2020.

Vakilinia, S., "Energy efficient temporal load aware resource allocation in cloud computing datacenters," Journal of Cloud Computing: Advanced, Systems and Applications, vol. 7, Article No. 2, Jan. 2018, 24 pp.

"Bloom Energy: Mission Critical," by Bloomenergy®, 2016, 2 pp. (Applicant points out, in accordance with MPEP 609.04(a), that the year of publication, 2016, is sufficiently earlier than the effective U.S. filing date, so that the particular month of publication is not in issue.).

"Bloom Energy: Microgrid Offerings," by Bloomenergy®, accessed from https://www.bloomenergy.com/sites/default/files/bloom-energy-microgrid-overview.pdf, Jun. 16, 2020, 4 pp.

"Clean, Reliable Power for Data Centers," by Bloomenergy®, 2018, 2 pp. (Applicant points out, in accordance with MPEP 609.04(a), that the year of publication, 2018, is sufficiently earlier than the effective U.S. filing date, so that the particular month of publication is not in issue.).

"Fuel Cell + Storage," by Bloomenergy® and PowerSecure, accessed from https://www.bloomenergy.com/sites/default/files/bloom-energy-integrated-storage.pdf, Jun. 16, 2020, 1 pp.

"Lithium-Ion Backup Batteries: A New Competitive Edge for Data Centers," Saft White Paper, Mar. 2018, 7 pp. retrieved from https://www.norwatt.es/files/faq/library_saft_data_centres.pdf on Jun. 16, 2020.

"Strategies for Solving the Datacenter Space, Power, and Cooling Crunch: Sun Server and Storage Optimization Techniques," Oracle White Paper, Mar. 2010, 18 pp.

"BU-808: How to Prolong Lithium-based Batteries," last updated Jul. 10, 2019, accessed from https://batteryuniversity.com/learn/article/how_to_prolong_lithium_based_batteries on Jun. 11, 2020, 89 pp.

"BU-903: How to Measure State-of-charge," last updated May 1, 2019, accessed from https://batteryuniversity.com/learn/article/how_to_measure_state_of_charge on Jun. 11, 2020, 15 pp.

YouTube dated May 31, 2019 entitled, "Chevron Technology Ventures," retrieved from https://youtu.be/MiuJD_EM7Z0. Jun. 16, 2020, 1 pp.

"Resiliency: AlwaysON Microgrids," by Bloomenergy®, accessed from https://www.bloomenergy.com/solutions/advanced-applications/microgrid, Jun. 30, 2020, 7 pp.

U.S. Appl. No. 16/161,445, filed Oct. 16, 2018, naming inventors Rangasamy et al.

International Preliminary Report on Patentability from International Application No. PCT/US2020/042491, dated Feb. 3, 2022, 8 pp.

Communication pursuant to Article 94(3) EPC from counterpart European Application No. 20753837.2 dated May 26, 2023, 7 pp.

Response to Communication pursuant to Article 94(3) EPC dated May 26, 2023, from counterpart European Application No. 20753837.2 filed Sep. 21, 2023, 96 pp.

* cited by examiner

DATA CENTER ENERGY MANAGEMENT SYSTEM USING AN ENERGY FLOW CONFIGURATION

CROSS REFERENCE

This application claims the benefit of U.S. Provisional Patent Application No. 62/876,475 filed on Jul. 19, 2019, which is hereby incorporated by reference herein in its entirety.

TECHNICAL FIELD

This disclosure relates to computer networks, and more specifically, to energy management for computer networks.

BACKGROUND

Due to the importance of power to a data center, a data center may include multiple levels of power redundancy. Traditionally, for example, power is primarily sourced from an electrical utility, through a power grid. Occasionally, however, the power grid fails, so data centers routinely employ one or more generators to provide power when the power grid fails or is otherwise unavailable. Generators often require a few minutes to become operational and fully online, so an uninterruptible power supply (UPS) is used to provide power during the generator startup time. Typically, the UPS uses rechargeable batteries to provide power, so during the time before the generator becomes operational, energy stored within the batteries is discharged to power the data center until the generator is available. Once started, the generator powers the data center until power from the power grid is restored. Once the power grid is restored, the generator is shut down, and the batteries in the UPS are recharged by the power grid.

SUMMARY

This disclosure describes techniques that include managing flows of energy within a system that includes one or more co-location facilities such as data centers using at least some of the energy flows to provide power to the data center(s). In some examples, an energy management system is described that uses energy utilization data and other sources of information to intelligently determine optimal energy flow configurations for a data center and other energy-related components associated with the data center. The energy flow configuration defines or describes how energy is to flow within the system that includes the data center, and which of the available sources of power are to be used to provide power to the data center at a given point in time. The energy flow configuration also defines whether energy is to be stored in an energy storage system (e.g., a battery storage system), or whether energy is to be discharged from the energy storage system and used for powering the data center or for another purpose.

In some examples, the energy management system may determine state of charge information, which may represent or describe the extent to which batteries included within an energy storage system (e.g., a battery storage system) are to be charged. The energy management system may determine a desired state of charge, which may include a number that is considered the optimal or most appropriate state or level of charge for the batteries for a given point in time, given available information. The energy management system may use the desired state of charge to determine whether energy should flow to the battery storage system to charge the batteries, or whether energy stored within the batteries should be discharged and used for powering the data center (or for another purpose), or whether neither charging nor discharging should occur.

The techniques described herein may provide one or more technical and other advantages. For instance, an effective energy management system may be able to reduce reliance on an electrical power grid, not only reducing the load on the power grid, but also enabling cost savings. Such cost savings may result from lower equipment costs. Also, by storing energy in a battery storage system, the data center may avoid drawing power from the electrical power grid during periods when energy costs are high. Use cases may be centered around peak shaving, frequency stability of the grid, increased resiliency, increased reliability, etc. The physical size of the size of the power delivery systems may also be reduced, potentially resulting in a data center with a smaller form factor. Another advantage could be to afford longer times for generator/s to ramp up to meet power needs after an outage in the utility power grid.

Further, by periodically or consistent storing energy in a battery storage system, it may be possible to rely on a power generation system that might not be capable of providing power sufficient to satisfy peak energy utilization needs for the data center. During times where the needs of the data center are such that the power generation system provides insufficient power, top-up energy might be provided by energy stored in the battery storage system. During other times where the needs of the data center are such that the power generation system provides more than enough energy to power the data center, the batteries may be recharged. Accordingly, in some examples, a power generation system that might otherwise be insufficient for peak energy needs of a given data center might nevertheless be effectively used for powering the data center within certain durations. Techniques in accordance with one or more aspects of the present disclosure might therefore enable significant reductions in equipment costs, while also reliably powering a data center in a consistent, sustainable, and/or cost-effective manner.

In some examples, this disclosure describes operations performed by an energy management system in accordance with one or more aspects of this disclosure. In one specific example, this disclosure describes a system including a power generation system; a battery storage system having a state of charge attribute; and processing circuitry having access to an electrical power grid, the power generation system, and the battery storage system, wherein the processing circuitry is configured to: determine an energy utilization forecast for a data center, monitor energy availability factors, determine, based on the energy utilization forecast and the monitored energy availability factors, an energy flow configuration defining energy flows involving the electrical power grid, the power generation system, the battery storage system, and the data center, wherein the energy flow configuration includes information identifying one or more of the power grid, the power generation system, or the battery storage system as a source of power for the data center, provide power to the data center based on the energy flow configuration, and manage energy flows involving the battery storage system based on the energy flow configuration.

DETAILED DESCRIPTION

Figure 1:
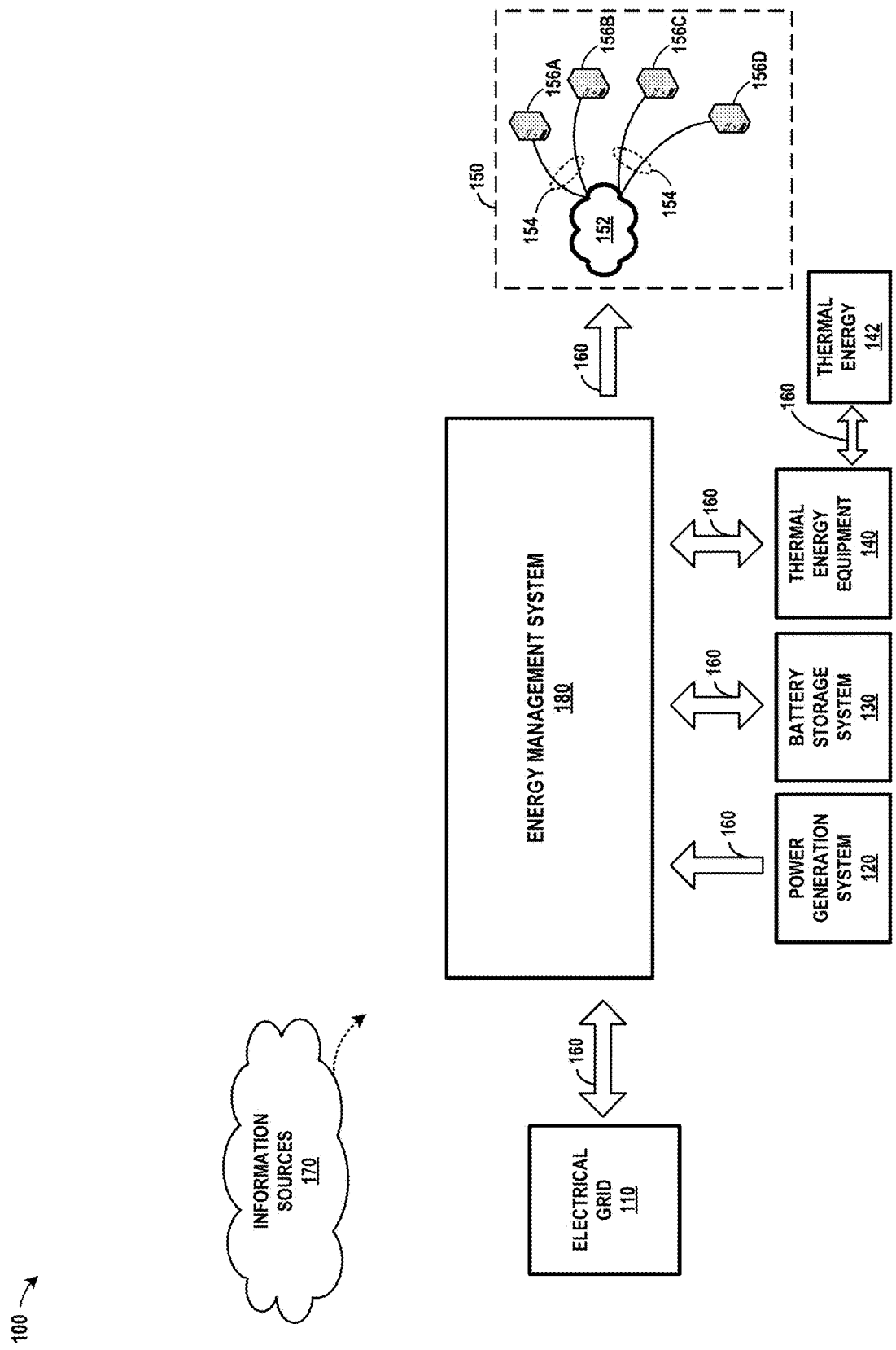
FIG. 1 is a conceptual diagram illustrating an example system in which an energy management system is used distribute energy to components and/or systems of a data center, in accordance with one or more aspects of the present disclosure.

FIG. 1 is a conceptual diagram illustrating an example system in which an energy management system is used distribute energy to components and/or systems of a data center, in accordance with one or more aspects of the present disclosure. The example of FIG. 1 includes electrical power grid 110, power generation system 120, energy storage system or battery storage system 130, thermal energy equipment 140, stored thermal energy 142, data center 150, information sources 170, and energy management system 180. Energy flows within system 100 are illustrated by energy flows 160, which may each represent energy flows in both directions.

In FIG. 1, electrical power grid 110 may be a conventional or other electrical power system, such as that typically provided by an electrical utility. Traditionally, electrical power grids 110 typically serve as a primary source of power for data centers, and may also serve a similar purpose if needed in examples described in connection with FIG. 1. However, in at least some examples, other sources of power, such as power generation system 120 and battery storage system 130 may be used as primary sources of power.

Power generation system 120 may be a power generation system that generates electrical power by converting fuel or other resource into electricity. In some examples, power generation system 120 may convert natural gas or biogas into electricity. In other examples, power generation system 120 may convert other types of fuel or natural resources into electricity, including wind, solar, or other types of resources.

In one specific example, power generation system 120 may use solid oxide fuel cells to convert natural gas or biogas into electricity through an electro-chemical process. Such a process is, for example, employed by commercially-available Bloom Energy Servers offered by Bloom Energy Corporation of Sunnyvale, California. In some cases, Bloom Energy Servers are capable of serving as a primary source of power to a data center, such as data center 150. Some power generation systems 120, such as those based on Bloom Energy Servers, are also capable of producing electricity onsite, at the location of the data center through a sustainable and/or carbon-neutral process. By producing energy onsite, vulnerabilities of conventional power transmission and distribution lines can be avoided, since the energy is generated where it is consumed. In some situations, Bloom Energy Servers are able to convert fuel into electricity through a process that generates little or no greenhouse gases, at least compared to combustion technologies.

Battery storage system 130 may be implemented through a series of lithium ion batteries or other types of batteries. In some examples, battery storage system 130 may be configured to store sufficient energy to serve as the sole source of power for data center 150 for a duration of a multiple hours, such as on the order of four to eight hours or longer. Also, in some examples, battery storage system 130 may include batteries having different chemistries, enabling varying attributes of different battery chemistries to be exploited as appropriate. For example, different battery chemistries accommodate different profiles of wear or durability profiles.

Thermal energy equipment 140 may represent other equipment used in operation of data center 150, such as cooling or heating systems that may regulate the temperature of data center 150 or components within data center 150 (e.g., data center devices 156, described below). In some examples, thermal energy equipment 140 may include heating and air conditioning equipment for regulating the temperature of the air in data center 150. Thermal energy equipment 140 may also include one or more electrical component cooling systems, such as a liquid cooling system that is used to regulate the temperature of computing devices that tend to operate optimally when kept sufficiently cool. Although in some examples described herein, thermal energy equipment 140 is primarily described in terms of a liquid cooling system capable of storing excess energy, thermal energy equipment 140 may alternatively, or in addition, represent other types of systems, components, or equipment used to regulate the temperature of components within system 200. Such other systems, components, or equipment may be capable of being configured to store excess thermal energy in a manner similar to that described below with respect to liquid cooling systems.

Data center 150 includes data center network 152 and any number of data center devices 156 (e.g., data center devices 156A, 156B, 156C, and data center device 156D, collectively "data center devices 156"). In the example of FIG. 1, each of data center devices 156 are powered by energy distributed by electrical connections 154. Each of data center devices 156 may correspond to any suitable computing device that may typically be found in a data center. One or more of data center devices 156 may alternatively be implemented as a network or data center device, and may include one or more network hubs, network switches, network routers, satellite dishes, or any other network equipment. Such devices or components (data center devices 156, generally) may be operatively inter-coupled, such as through data center network 152, thereby providing for the exchange of information between computers, devices, or other components (e.g., between one or more client devices or systems and one or more server devices or systems).

Data center network 152, included within data center 150, may be an internal or local network for use by data center devices 156 within data center 150. However, data center network 152 may also, in other examples, be or include the internet, or may include or represent any public or private communications network or other network. For instance, data center network 152 may be or include a cellular, Wi-Fi®, ZIGBEE, BLUETOOTH, Near-Field Communication (NFC), satellite, enterprise, service provider, and/or other type of network enabling transfer of transmitting data between computing systems, servers, and computing devices. Data center network 152 may include one or more network hubs, network switches, network routers, satellite dishes, or any other network equipment. Such devices or components may be operatively inter-coupled, thereby providing for the exchange of information between computers, devices, or other components (e.g., between one or more client devices or systems and one or more server devices or systems). Each of data center devices 156 illustrated in FIG. 2 may be operatively coupled to data center network 152 using electrical connections 154 and/or one or more network links, which may be Ethernet or other types of network connections, and such connections may be wireless and/or wired connections.

Although only one data center 150 and a limited number of data center devices 156 are shown in FIG. 1, techniques in accordance with one or more aspects of the present disclosure may be performed across multiple data centers, including multiple geographically distributed data centers. Accordingly, individual or collective references to data center 150, data center network 152, electrical connections 154, and data center devices 156, and/or other items may be understood to represent references to any number of such data centers, data center networks, electrical connections, data center devices, systems, components, devices, modules, and/or other items.

Information sources 170 may represent one or more sources of data used by energy management system 180 or other components of system 100. Information sources 170 may include information available over the internet, and may provide access to information about weather and news information, energy market information, environmental and commercial information, and/or other information. Information sources 170 may, as described herein, provide information to energy management system 180 for use in determining and/or forecasting the energy needs of data center 150.

Energy management system 180 may represent a system for controlling and/or distributing energy between components and/or systems included within system 100, in accordance with one or more aspects of the present disclosure. In some examples, energy management system 180 may be implemented through a computing system and energy distribution hardware. The computing system controls the operation of the energy distribution hardware so that the energy distribution hardware distributes energy among electrical power grid 110, power generation system 120, battery storage system 130, thermal energy equipment 140, and/or data center 150. The computing system may be any suitable computing device or system, such as one or more server computers, workstations, mainframes, appliances, cloud computing systems, and/or other computing systems that may be capable of performing operations and/or functions described in accordance with one or more aspects of the present disclosure. In some examples, the computing system may represent or be implemented through a cloud computing system, server farm, server cluster, and/or through another type of system.

The energy distribution hardware, included within the energy management system 180 and controlled by the computing system, may have access to systems that may include an electrical power grid, a power generation system, a battery storage system, a data center, and other systems, and may be able to direct flows among such systems. Accordingly, energy management system 180 may be separate from and external to such systems, and yet may be able to define, in the manner described herein, how energy flows between and/or involving an electrical power grid, a power generation system, a battery storage system, a data center, and other systems.

In a traditional data center, data center 150 might normally be powered primarily using energy from electrical power grid 110. Often such a traditional design would include a generator (not shown), which can be used to provide power when electrical power grid 110 fails. Similarly, an uninterruptible power supply (UPS), typically comprising an array of batteries, is used to provide power while the generator starts, which can take a few minutes. Thereafter, the generator powers data center 150 until electrical power grid 110 becomes operational again.

In the example illustrated in FIG. 1, various other energy sources may be used, as times, to provide a primary source of power. For instance, power generation system 120 may, in some cases, be used to provide power that is more cost-effective than that provided by electrical power grid 110. Accordingly, where power generation system 120 is more cost-effective than energy provided by electrical power grid 110, energy management system 180 may cause data center 150 to be principally powered by power generation system 120, rather than by electrical power grid 110. In addition, energy management system 180 may also use energy stored in battery storage system 130 to power data center 150 at times, depending on a number of factors, including current power requirements of data center 150. While data center 150 might still be powered primarily by electrical power grid 110, in some cases, energy management system 180 may selectively and/or periodically disconnect data center 150 from electrical power grid 110 in favor of other sources of energy. In other cases, energy management system 180 may use electrical power grid 110 for supplying supplemental or backup power to data center 150, for charging battery storage system 130, or for other situations or purposes.

In some examples, power generation system 120 may have attributes (e.g., initial capital cost, design, as well as other factors) such that power generation system 120 is capable of providing more efficient power (from a cost, energy production, and/or energy use perspective) if power generation system 120 is consistently being used at peak capacity or at substantially near peak capacity. In some examples, substantially near peak capacity could represent peak capacity or could represent a cost-effective or even cost-optimal capacity. However, many data centers experience a periodic cycle of peak and non-peak energy utilization or load times. In some cases, peak utilization loads might occur at predictable times. For instance, peak utilization periods might occur during particular times of the day (e.g., between 9 am and 5 pm) or on particular days of the week (e.g., weekdays). During non-peak utilization periods, the energy requirements of data center 150 may be significantly less, such as on the order of 40-50% less than during peak utilization periods.

In some implementations, and conventionally, power generation system 120 may be sized to accommodate the peak load demanded by data center 150. Yet if sized to accommodate peak loads demanded by data center 150, power generation system 120 would often not be being used at peak capacity, and power generation system 120 might therefore not be utilized in the most efficient manner from a cost, energy production, and/or energy use perspective.

Accordingly, in some examples, and in accordance with one or more aspects of the present disclosure, power generation system 120 may be chosen, sized, and/or configured to provide more than sufficient energy to power data center 150 at times, but less than sufficient energy to power data center 150 at other times. For instance, in one example that can be described with reference to FIG. 1, the capacity of power generation system 120 in FIG. 1 is chosen to be capable of providing a peak amount of power that is sufficient to exceed the requirements of data center 150 during non-peak loads for data center 150. However, that peak amount of power capable of being provided by power generation system 120 might nevertheless be less than is required to power data center 150 during peak usage times.

To consistently power data center 150 in such an example, energy management system 180 may manage energy flows within system 100 during non-peak energy utilization periods. For instance, with reference to FIG. 1, energy management system 180 configures and/or causes power generation system 120 to run at peak or optimally efficient capacity. Energy management system 180 causes energy from power generation system 120 to be directed to data center 150 (e.g., via energy flows 160), and thereby serves as a primary source of power for data center 150. Energy management system 180 monitors the energy utilization of data center 150. Energy management system 180 uses power generation system 120 as the sole source of power when the energy utilization of data center 150 is less than peak levels, since, in that situation, power generation system 120 is capable of providing sufficient power. And since power generation system 120 is operating at peak or optimally efficient capacity, power generation system 120 might generate more energy than is needed by data center 150. Accordingly, energy management system 180 monitors the energy generated by power generation system 120 in comparison with the energy used by data center 150 and determines whether power generation system 120 is generating energy beyond what is needed by data center 150. When energy management system 180 determines that excess energy is being generated by power generation system 120, energy management system 180 directs the excess energy to battery storage system 130, and thereby causes battery storage system 130 to recharge, storing energy in battery storage system 130 and increasing the degree to which batteries included within battery storage system 130 are charged (i.e., increasing the state of charge attribute associated with battery storage system 130). In some examples, energy management system 180 might not direct excess energy to battery storage system 130, such as (but not limited to) when battery storage system 130 has already been recharged and/or is not able to efficiently store additional energy.

Energy management system 180 may also manage energy flows within system 100 during peak energy utilization periods. For instance, again referring to FIG. 1, energy management system 180 continues to monitor energy utilization of data center 150. Energy management system 180 determines that energy utilization by data center 150 has increased. Energy management system 180 further determines that power generation system 120 is not capable of providing sufficient power to meet the needs of data center 150. Energy management system 180 causes energy stored in battery storage system 130 to be directed to data center 150, thereby meeting the energy needs of data center 150. Accordingly, during periods of peak power utilization, energy management system 180 draws from power stored in battery storage system 130, and uses battery storage system 130 to provide top-up power to bridge the gap between the power capable of being provided by power generation system 120 and that required by data center 150. In some examples, energy management system 180 might not draw power from battery storage system 130, and instead, may draw some or all remaining needed power from another source, such as electrical power grid 110.

In some examples, energy management system 180 may also draw from other sources as needed, such as from electrical power grid 110. Energy management system 180 may also, as appropriate, draw from excess energy stored in the form of thermal energy, represented by stored thermal energy 142. Such energy may take the form of resources used to regulate the temperature of components of system 100. In one example, stored thermal energy 142 may be cooled water that is used by thermal energy equipment 140 (e.g., a cooling system). In such an example, and as further described in connection with FIG. 2, energy is consumed by thermal energy equipment 140 when cooling the water in preparation for use in the cooling system, and at least some of the consumed energy is absorbed by the water during the process of cooling the water. Once cooled, the water serves as stored thermal energy 142.

In a number of ways, energy management system 180 may intelligently control the flow of energy between power generation system 120, battery storage system 130, stored thermal energy 142, data center 150 and/or other components of system 100. In one example, and as described above, energy management system 180 may cycle between using primarily energy provided by power generation system 120 to power data center 150, and using a combination of energy provide by power generation system 120 and stored energy in battery storage system 130 to power data center 150. In such an example, and during non-peak power utilization periods for data center 150, power generation system 120 may normally provide sufficient energy to power data center 150, with any excess energy being stored in battery storage system 130. During peak power utilization periods for data center 150, power generation system 120 may provide some of the energy needed to power data center 150, with battery storage system 130 or electrical power grid 110 or other sources of energy providing any remaining required energy.

Although some implementations in accordance with techniques described herein may be thought of as being implemented by simply using multiple redundant battery sets (e.g., periodically charging one battery set while discharging another battery set), the techniques described herein, at least in some implementations, are more sophisticated and therefore more effective. For instance, in a system in which energy management system 180 manages battery storage system 130 as a system that can transition quickly and often between charging states and discharging states, energy management system 180 may be able to effectively and advantageously manage particular aspects individual batteries or battery cells and/or stacks within battery storage system 130. Such a system may, for example, more effectively manage and optimize the life, performance, health, and durability of individual batteries within the battery storage system. In addition, such a system may more effectively manage and optimize performance of the batteries according to and taking into account any differences in battery chemistry and life stage. On the other hand, managing multiple redundant battery sets by simply charging one battery set while discharging another, and then switching between sets when one is depleted, may result in a reduction of battery longevity (at least for batteries based on lithium-ion technology), as well as other negative effects.

Further, employing batteries having multiple different types of battery chemistries in varying profiles and configurations may provide some technical advantages. These advantages may include selection of chemistries for optimization for high power density versus energy density, and series versus parallel connections to accommodate varied charge/discharge requirements. In some examples, selection of chemistry and method of connection in combination with management of state and rate of charge/discharge of each subset may provide one or more significant technical advantages, including meeting short duration torque and regenerative braking requirements in traction applications, extension of cell life, faster response to step load changes, faster charging and discharging, deeper discharges of high power components, and other advantages.

In some examples, energy management system 180 may be part of a data center infrastructure monitoring platform or may execute on a data center infrastructure monitoring platform. An example of such a platform is described in U.S. patent application Ser. No. 16/161,445, filed Oct. 16, 2018, entitled "Data Center Agent For Data Center Infrastructure Monitoring Data Access And Translation," the entire content of which is incorporated herein by reference.

The techniques described herein may provide various technical and other advantages. For instance, by using power generation system 120 as a primary source of power for 150, system 100 may be able to avoid, for significant periods of time, reliance on electrical power grid 110. As a result, electrical power grid 110 may place less strain on electrical power grid 110 and avoid costs associated with significant reliance on electrical power grid 110. System 100 may be able to not only reduce costs associated with the amount of energy drawn from electrical power grid 110, but system 100 may also be able engage in effective peak shaving by using power from power generation system 120 and/or battery storage system 130 to significantly reduce peak power draws from electrical power grid 110.

Similarly, by storing energy in battery storage system 130 and discharging that stored energy to power data center 150 at strategic times, system 100 may avoid drawing power from electrical power grid 110 during periods in which energy from electrical power grid 110 is in high demand or when power generation system 120 is unavailable or insufficient. As a result, use of battery storage system 130 by system 100 may also place less strain on electrical power grid 110 and may also cause system 100 to use less energy from electrical power grid 110 during periods when high costs are associated with energy drawn from electrical power grid 110. Similarly, system 100 may therefore be capable of limiting its need for energy from electrical power grid 110 to periods when electrical power grid 110 provides energy at a lower cost. Also, by intelligently storing energy within battery storage system 130 and possibly also taking into account a diverse set of battery chemistries that might be included within battery storage system 130, it may be possible for battery storage system 130 to effectively store significant amounts of energy within battery storage system 130. Storing energy may also help reduce the energy losses that might otherwise arise in energy transfers when powering a data center, such as those relating to conversions between alternating and direct current electrical energy.

In addition, by deploying power generation system 120 and/or battery storage system 130 for use in a data center at sufficient scale, it may be unnecessary to incur the expense, maintenance, and other costs associated with equipment traditionally used by data centers. For instance, in some examples, system 100 may operate effectively without the use of a generator to accommodate times when electrical power grid 110 is unavailable. Other equipment that might otherwise be used to accommodate vulnerabilities of electrical power grid 110 might also be unnecessary. However, in systems in which one or more generators are employed, techniques in accordance with the present disclosure may be able to provide additional time for such generators to ramp up to meet power needs after an outage (e.g., involving electrical power grid 110).

Figure 2:
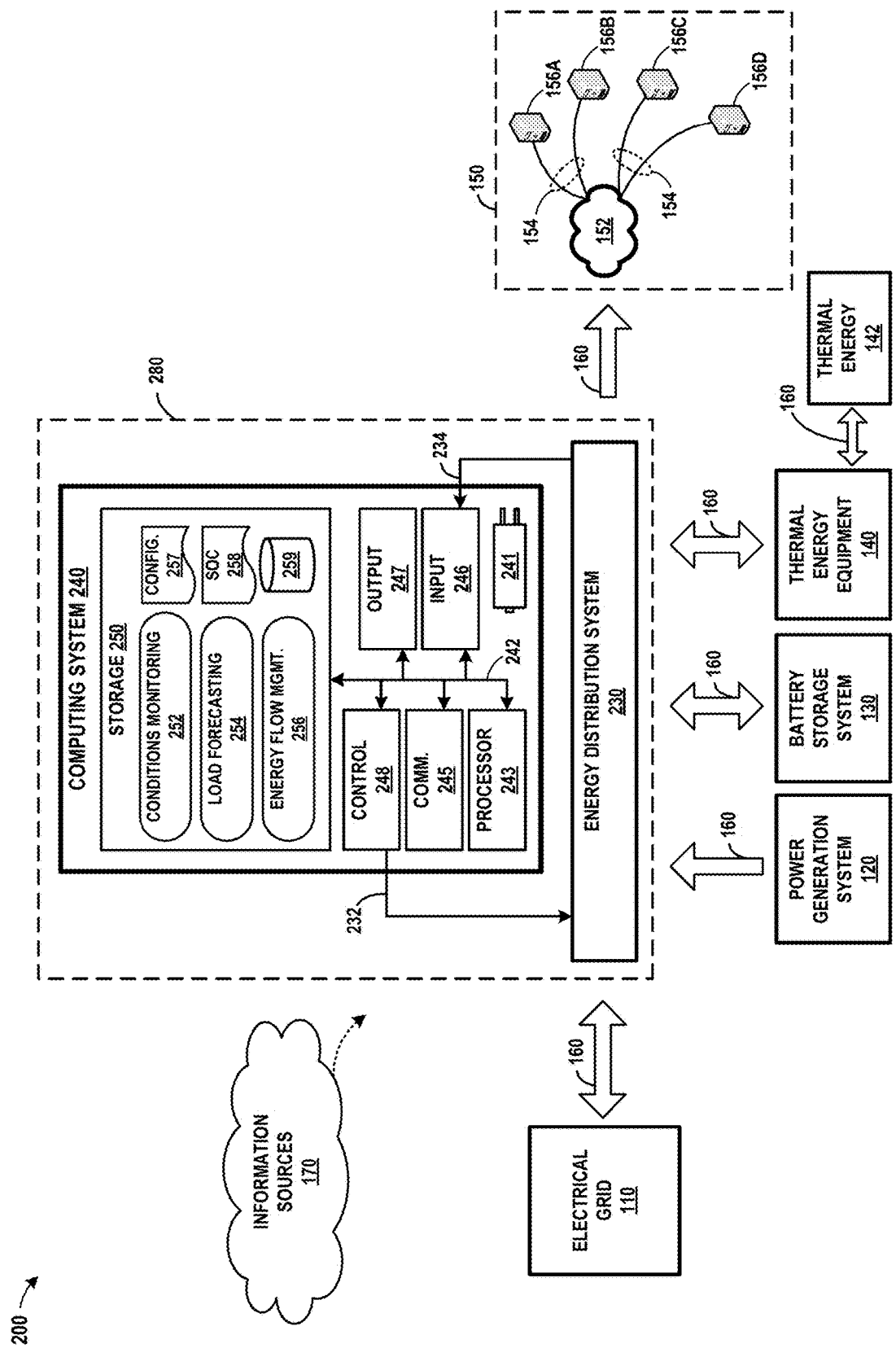
FIG. 2 is a block diagram illustrating an example energy management system that manages flows of energy within a system, in accordance with one or more aspects of the present disclosure.

FIG. 2 is a block diagram illustrating an example energy management system that manages flows of energy within a system, in accordance with one or more aspects of the present disclosure. System 200 of FIG. 2 may be described as an example or alternative implementation of system 100 of FIG. 1. In the example of FIG. 2, system 200 includes many of the same components as system 100 illustrated in FIG. 1. These similarly-labeled devices, systems, and/or components may be implemented in a manner consistent with the description of the corresponding system provided in connection with FIG. 1, although in some examples such systems may involve alternative implementations with more, fewer, and/or different capabilities. One or more aspects of FIG. 2 may be described herein within the context of FIG. 1.

FIG. 2 also illustrates energy management system 280, which may correspond to energy management system 180 of FIG. 1. In FIG. 2, energy management system 280 includes computing system 240 and energy distribution system 230. Computing system 240 communicates information, data, and control signals to energy distribution system 230 over connection 232. Energy distribution system 230 communicates information and data to computing system 240 over connection 234.

Energy distribution system 230 is a set of hardware devices that connected to or interfacing with electrical power grid 110, power generation system 120, battery storage system 130, thermal energy equipment 140, and data center 150. Energy distribution system 230 operates to control, at the direction of computing system 240, various components of system 200. Specifically, in the example of FIG. 2, energy distribution system 230 directs energy flows 160 by and between power generation system 120, battery storage system 130, and thermal energy equipment 140. Energy distribution system 230 also directs energy flows 160 to data center 150, thereby providing power to data center 150.

Computing system 240 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 240 represents a cloud computing system, server farm, and/or server cluster (or portion thereof) that provides energy management services and interacts with energy distribution system 230 to manage energy within system 100. In other examples, computing system 240 may represent or be implemented through one or more virtualized compute instances (e.g., virtual machines, containers) of a data center, cloud computing system, server farm, and/or server cluster.

In the example of FIG. 2, computing system 240 may include power source 241, one or more processors 243, one or more communication units 245, one or more input devices 246, one or more output devices 247, one or more control signal generators 248, and one or more storage devices 250. Storage devices 250 may include or store code implementing conditions monitoring modules 252, load forecasting modules 254, energy flow management modules 256, energy flow configuration information 257, desired state of charge information 258, and data store 259. One or more of the devices, modules, storage areas, or other components of computing system 240 may be interconnected to enable inter-component communications (physically, communicatively, and/or operatively). In some examples, such connectivity may be provided by through communication channels (e.g., communication channels 242), a system bus, a network connection, an inter-process communication data structure, or any other method for communicating data.

Power source 241 may provide power to one or more components of computing system 240. Power source 241 may receive power from one or more of the sources of energy illustrated in FIG. 2 (e.g., electrical power grid 110, power generation system 120, and/or battery storage system 130). In other examples, power source 241 may receive power from the primary alternating current (AC) power supply in a building, home, or other location. In other examples, power source 241 may be a battery or a device that supplies direct current (DC). In still further examples, computing system 240 and/or power source 241 may receive power from another source. One or more of the devices or components illustrated within computing system 240 may be connected to power source 241, and/or may receive power from power source 241. Power source 241 may have intelligent power management or consumption capabilities, and such features may be controlled, accessed, or adjusted by one or more modules of computing system 240 and/or by one or more processors 243 to intelligently consume, allocate, supply, or otherwise manage power.

One or more processors 243 of computing system 240 may implement functionality and/or execute instructions associated with computing system 240 or associated with one or more modules illustrated herein and/or described below. One or more processors 243 may be, may be part of, and/or may include processing circuitry that performs operations in accordance with one or more aspects of the present disclosure. Examples of processors 243 include microprocessors, application processors, display controllers, auxiliary processors, one or more sensor hubs, and any other hardware configured to function as a processor, a processing unit, or a processing device. Central monitoring system 210 may use one or more processors 243 to perform operations in accordance with one or more aspects of the present disclosure using software, hardware, firmware, or a mixture of hardware, software, and firmware residing in and/or executing at computing system 240.

One or more communication units 245 of computing system 240 may communicate with devices external to computing system 240 by transmitting and/or receiving data, and may operate, in some respects, as both an input device and an output device. In some examples, communication unit 245 may communicate with information sources 170 or other devices over a network. In other examples, communication units 245 may send and/or receive radio signals on a radio network such as a cellular radio network. In other examples, communication units 245 of computing system 240 may transmit and/or receive satellite signals on a satellite network such as a Global Positioning System (GPS) network. Examples of communication units 245 include a network interface card (e.g. such as an Ethernet card), an optical transceiver, a radio frequency transceiver, a GPS receiver, or any other type of device that can send and/or receive information. Other examples of communication units 245 may include devices capable of communicating over BLUETOOTH®, GPS, NFC, ZIGBEE, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, BLUETOOTH, NFC, or other technologies or protocols.

One or more control signal generators 248 may generate control signals for controlling aspects of energy distribution system 230 or any of power generation system 120, battery storage system 130, or thermal energy equipment 140. In some examples, control signal generator 248 may output signals to energy distribution system 230 that affect the manner in which power is provided to data center 150. In other examples, control signal generator 248 may output signals to energy distribution system 230 that may affect whether and to what extent power is received from electrical power grid 110 to power aspects of system 200. Control signal generator 248 may also output signals to energy distribution system 230 that cause power from power generation system 120 and/or battery storage system 130 to be exported to electrical power grid 110. In general, control signal generator 248 communicates with energy distribution system 230 over connection 232, although control signal generator 248 may communicate with energy distribution system 230 and other devices in other ways.

One or more input devices 246 may represent any input devices of computing system 240 not otherwise separately described herein. One or more input devices 246 may generate, receive, and/or process input from any type of device capable of detecting input from a human or machine. In FIG. 2, input device 246 receives information or data from energy distribution system 230, which may represent information about energy utilization of data center 150, or the condition of one or more of power generation system 120, battery storage system 130, or another device. One or more input devices 246 may generate, receive, and/or process input in the form of electrical, physical, audio, image, and/or visual input (e.g., peripheral device, keyboard, microphone, camera).

One or more output devices 247 may represent any output devices of computing system 280 not otherwise separately described herein. One or more output devices 247 may generate, receive, and/or process output from any type of device capable of detecting input from a human or machine. For example, one or more output devices 247 may generate, receive, and/or process output in the form of electrical and/or physical output (e.g., peripheral device, actuator).

Although various components illustrated in FIG. 2 may be illustrated separately in FIG. 2, in other examples, one or more of such components may be combined into a single device, or may be the same device. For instance, in some examples, communication unit 245 and input device 246 may be implemented as one device. Output device 247 and control signal generator 248 may be implemented as one device. Communication unit 245 and output device 247 may be implemented as one device.

One or more storage devices 250 within computing system 240 may store information for processing during operation of computing system 240. Storage devices 250 may store program instructions and/or data associated with one or more of the modules described in accordance with one or more aspects of this disclosure. One or more processors 243 and one or more storage devices 250 may provide an operating environment or platform for such modules, which may be implemented as software, but may in some examples include any combination of hardware, firmware, and software. One or more processors 243 may execute instructions and one or more storage devices 250 may store instructions and/or data of one or more modules. The combination of processors 243 and storage devices 250 may retrieve, store, and/or execute the instructions and/or data of one or more applications, modules, or software. Processors 243 and/or storage devices 250 may also be operably coupled to one or more other software and/or hardware components, including, but not limited to, one or more of the components of computing system 240 and/or one or more devices or systems illustrated as being connected to computing system 240.

In some examples, one or more storage devices 250 are used for temporary storage, meaning that a primary purpose of the one or more storage devices is not long-term storage. Storage devices 250 of computing system 240 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 250, in some examples, also include one or more computer-readable storage media. Storage devices 250 may be configured to store larger amounts of information than volatile memory. Storage devices 250 may further be configured for long-term storage of information as non-volatile memory space and retain information after activate/off cycles. Examples of non-volatile memories include magnetic hard disks, optical discs, Flash memories, or forms of electrically programmable memories (EPROM) or electrically erasable and programmable (EEPROM) memories.

Conditions monitoring module 252 may perform functions relating to analyzing news, weather, commercial, and other information that may affect the operation of data center 150 or system 200 generally. Conditions monitoring module 252 may receive, from information sources 170, information that it uses to generate an analysis for consumption by energy flow management module 256. Conditions monitoring module 252 may analyze information relating to energy costs when determining an appropriate source of power for data center 150. Conditions monitoring module 252 may also monitor conditions of power generation system 120 and/or battery storage system 130, and may output, to energy flow management module 256, information that may affect generation of energy flow configuration information 257 and/or desired state of charge information 258. In some examples, functions performed by conditions monitoring module 252 could be performed by software or by a hardware device executing software. In other examples, functions performed by conditions monitoring module 252 may be implemented primarily or partially through hardware.

Load forecasting module 254 may perform functions relating to forecasting energy use by data center 150, which may include analyzing information about data center 150 and the historical operation of data center 150. In some examples, load forecasting module 254 may apply a machine learning model that has been trained using historical data stored in data store 259 (or elsewhere) to information about energy usage of data center 150. By applying the model, load forecasting module 254 may generate an energy utilization forecast. Load forecasting module 254 may output the energy utilization forecast for use by energy flow management module 256 in generating energy flow configuration information 257 and/or desired state of charge information 258. Load forecasting module 254 may receive information from and output information to one or more other modules, and may otherwise interact with and/or operate in conjunction with one or more other modules of computing system 240. Although load forecasting module 254 may be described in connection with FIG. 2 as primarily generating an energy utilization forecast for use by energy flow management module 256, load forecasting module 254 may alternatively, or in addition, perform other operations.

Energy flow management module 256 may perform functions relating to generating energy flow configuration information 257 and/or desired state of charge information 258. Energy flow management module 256 may receive information from conditions monitoring module 252 and load forecasting module 254 and based on such information, generate energy flow configuration information 257 and desired state of charge information 258. Although energy flow management module 256 may be described in some contexts as primarily using data from conditions monitoring module 252 and load forecasting module 254, energy flow management module 256 may alternatively, or in addition, use other data from other information sources. Based on energy flow configuration information 257 and/or desired state of charge information 258, energy flow management module 256 may cause control signal generator 248 to output control signals to energy distribution system 230 to thereby control energy flows within system 200 and provide power to data center 150.

Energy flow configuration information 257 may include information defining how energy is to flow within system 200. Energy flow configuration information 257 may include information identifying one or more primary source of power for data center 150 (e.g., electrical power grid 110, power generation system 120, and/or battery storage system 130). Energy flow configuration information 257 may include information about whether battery storage system 130 is to supply energy (discharge) or store energy (charge). Energy flow configuration information 257 may include information about to what extent energy should be supplied to thermal energy equipment 140 to be stored as stored thermal energy 142, and whether it is appropriate to store extra energy as stored thermal energy 142. Energy flow configuration information 257 may include information about whether power should be provided to electrical power grid 110 in exchange for compensation. Energy flow configuration information 257 may be created or updated by energy flow management module 256.

Desired state of charge information 258 may include information describing the battery charge state that energy flow management module 256 has determined is appropriate, optimal, or preferred, given the factors considered by energy flow management module 256. In some examples, desired state of charge information 258 may describe the extent to which batteries included within battery storage system 130 are to be charged to capacity, which may correspond simply to an appropriate charge level for battery storage system 130. In some examples, such a charge level might range from little or no stored energy (i.e., a "0%" battery storage level) to the maximum amount of energy that battery storage system 130 can store (i.e., a "100%" battery storage level). In other examples, desired state of charge information 258 may be represented by a range or a time sequence, indicating a desired charge percentage as a function of time. Although desired state of charge information 258 is illustrated in FIG. 2 as being separate from energy flow configuration information 257, desired state of charge information 258 may be part of and/or integrated into energy flow configuration information 257. Desired state of charge information 258 may be created or updated by energy flow management module 256.

Data store 259 may represent any suitable data structure or storage medium for storing information related to information used by conditions monitoring module 252, load forecasting module 254, and energy flow management module 256 to generate energy flow configuration information 257 and/or desired state of charge information 258. In some examples, data store 259 may include historical energy utilization data pertaining to data center 150 or other data centers. Such data may be used to generate an energy utilization forecast or train a machine learning model to generate such a forecast. The information stored in data store 259 may be searchable and/or categorized such that one or more modules within computing system 240 may provide an input requesting information from data store 259, and in response to the input, receive information stored within data store 259. Data store 259 may be primarily maintained by energy flow management module 256. Data store 259 may provide other modules with access to the data stored within data store 259, and/or may analyze the data stored within data store 259 and output such information on behalf of other modules of computing system 240.

In the example of FIG. 2, energy management system 280 may power data center 150 through a primary power source, such as electrical power grid 110. For instance, in an example that can be described with reference to FIG. 2, energy flow management module 256 causes control signal generator 248 to output a signal to energy distribution system 230. Energy distribution system 230 interprets the signal as a command to cause power from electrical power grid 110 to be distributed to data center 150. Energy distribution system 230 causes energy from electrical power grid 110 to flow to data center 150, thereby powering components within data center 150, including data center devices 156. In the example shown in FIG. 2, power flows to each of data center devices 156 over one or more electrical connections 154 within data center 150.

Alternatively, or in addition, energy management system 280 may power data center 150 using another primary power source, such as power generation system 120. For instance, in such an example, energy flow management module 256 causes control signal generator 248 to output a signal to energy distribution system 230. Energy distribution system 230 interprets the signal as a command to cause power from power generation system 120 to be distributed to data center 150 to thereby power components with data center 150. In situations in which power generation system 120 is a more cost-effective source of energy than electrical power grid 110, energy management system 280 may select power generation system 120 as a primary source of energy for powering data center 150. In some situations, when power generation system 120 is available and when power generation system 120 is capable of providing sufficient capacity to handle current energy needs, power generation system 120 may the sole source of power for data center 150.

In another example, energy management system 280 may power data center 150 using battery storage system 130 or using a combination of energy sources. For instance, again referring to FIG. 2, energy flow management module 256 causes control signal generator 248 to output a signal to energy distribution system 230. Based on the signal, energy distribution system 230 causes power generation system 120 to provide power to data center 150. Energy flow management module 256 may determine that power generation system 120 is not able to provide a sufficient amount of power for some high-usage energy needs. In such situation, energy flow management module 256 may cause battery storage system 130 to discharge stored energy to supplement the power provided by power generation system 120 and thereby needs of data center 150.

Energy management system 280 may appropriately power data center 150 during power failures. For instance, in an example where electrical power grid 110 and/or power generation system 120 are not available, energy management system 280 may use energy stored in battery storage system 130 as a primary power source for data center 150. Depending on the configuration of battery storage system 130, battery storage system 130 may be able to provide power to data center 150 for a significant period of time (e.g., on the order of four to eight hours or longer).

Accordingly, in some examples, energy management system 280 is capable of controlling how data center 150 is powered, and energy management system 280 may selectively supply power to data center 150 so that energy from electrical power grid 110, power generation system 120, and battery storage system 130 may be combined and/or used in many different ways to power data center 150. Energy distribution system 230 may also be configured to disconnect or effectively disconnect any particular energy source for a period of time. For instance, in one example, energy flow management module 256 causes control signal generator 248 to output a signal to energy distribution system 230. In response to the signal, energy distribution system 230 disconnects data center 150 from electrical power grid 110, and causes data center 150 to be powered by energy derived from power generation system 120 and/or battery storage system 130. Similarly, and in general, energy distribution system 230 may also disconnect data center 150 from any other source of power (e.g. power generation system 120 and battery storage system 130), so that data center 150 may be powered by any other individual source of power, or any combination of any remaining sources of power.

In the example of FIG. 2, energy management system 280 may cause power generation system 120 to provide power to data center 150 during non-peak power utilization periods. For instance, in an example that can be described with reference to FIG. 2, energy flow management module 256 causes control signal generator 248 to communicate with energy distribution system 230. Responsive to the communication, energy distribution system 230 causes power generation system 120 to generate energy at peak capacity, and distribute sufficient energy to data center 150 to meet the energy requirements of data center 150. Energy distribution system 230 further causes any excess energy generated by power generation system 120, not needed by data center 150, to be stored within battery storage system 130.

Energy management system 280 may cause multiple energy sources to provide power to data center 150 during peak power utilization periods. For instance, again referring to FIG. 2, energy flow management module 256 causes control signal generator 248 to communicate with energy distribution system 230 over connection 232. Responsive to the communication, energy distribution system 230 causes power generation system 120 to generate energy at peak capacity, and distribute that energy to data center 150. In some examples, power generation system 120 might not be capable of providing power sufficient to power data center 150, even when with power generation system 120 operating at maximum energy production capacity. Input device 246 detects input and outputs information about the input to conditions monitoring module 252. Conditions monitoring module 252 determines that the input corresponds to information (e.g., from information sources 170 or from input device 246 via connection 234) about energy utilization of data center 150. Conditions monitoring module 252 outputs information about the energy utilization to energy flow management module 256. Energy flow management module 256 determines, based on the energy utilization information, that data center 150 requires (or is close to requiring) more energy than power generation system 120 is capable of supplying. Energy flow management module 256 causes control signal generator 248 to further communicate with energy distribution system 230 over connection 232.

Responsive to the communication, energy distribution system 230 causes energy stored within battery storage system 130 to be distributed to data center 150 in order to meet any energy needs of data center 150 that exceed the energy available from power generation system 120. In the example being described, battery storage system 130 provides top-up power to power generation system 120, thereby meeting the needs of data center 150. In some cases, power generation system 120 and battery storage system 130 can provide sufficient energy to data center 150 during peak power utilization periods without requiring energy from electrical power grid 110.

In some situations, such as where power generation system 120 and battery storage system 130 do not have enough energy to meet the needs of data center 150, energy distribution system 230 may draw power from electrical power grid 110 and distribute such power to data center 150 to meet the remaining power needs of data center 150. Such a situation may arise where power generation system 120 is experiencing a failure or where battery storage system 130 does not have a sufficient amount of stored energy to provide top-up power during a peak usage period experienced by data center 150. Energy distribution system 230 might also draw energy from electrical power grid 110 during times where the cost of energy provided by electrical power grid 110 is favorable (e.g., cheaper) relative to that provided by power generation system 120 or relative to the effective cost of discharging stored energy from battery storage system 130.

In some examples, thermal energy equipment 140 may be used to regulate the temperature of various components within system 200. For example, the temperature of certain components of system 200 may tend to rise as such components are used. The efficient operation of such components may depend on regulating their temperature during operation, which often means requires cooling the components. In one example, thermal energy equipment 140 may represent a liquid cooling system that uses cool water to reduce the temperature of one or more hardware components within system 200. In such an example, water is cooled by thermal energy equipment 140, and the cooled water is circulated within system 200 near enough to the hardware components such that thermal heat from the components is transferred to the water. In other words, as the water is brought into thermal contact with the components, the water absorbs heat from the components, cooling the components but resulting in the water being heated. The heated water is then typically re-cooled so that it can later be used to further absorb excess heat from hardware components of system 200. Cooling the water requires energy, and once energy is used to cool water, the cooled water represents stored energy. Accordingly, cooled water is one example of stored thermal energy 142 shown in FIG. 2.

Energy management system 280 may also store excess energy as stored thermal energy 142. For instance, in an example that can be described with reference to FIG. 2, energy flow management module 256 causes control signal generator 248 to communicate with energy distribution system 230 over connection 232. Responsive to the communications, energy distribution system 230 directs energy from electrical power grid 110, power generation system 120, and/or battery storage system 130 to thermal energy equipment 140. Thermal energy equipment 140 cools water that can be used as part of a liquid cooling system, as described above. In some examples, thermal energy equipment 140 may cool more water than normal or may cool water to an even higher-than-normal temperature, and thereby effectively storing extra thermal energy as stored thermal energy 142. Therefore, and in general, some of energy flows 160 of FIG. 2 involve energy being stored as stored thermal energy 142 that can be later used to advantageously manage thermal energy generated by or absorbed by electrical, computing, and/or other components of system 200.

In the example of FIG. 2, and in accordance with one or more aspects of the present disclosure energy management system 280 may intelligently control the flow of energy within system 200 so that available sources of power, or combinations thereof, are used to power data center 150 in a consistent, reliable, sustainable, and/or cost-effective manner. For instance, in FIG. 2, energy management system 280 may evaluate a number of factors to determine not only how to provide power to data center 150, but also whether to store energy or to discharge stored energy. In some examples, the evaluated factors influence a strategic determination as to how to optimize energy flows within system 200, and how much energy to store in battery storage system 130 and/or as stored thermal energy 142 (or whether to discharge energy from battery storage system 130 and/or stored thermal energy 142). One factor of significant importance is the expected near-term (e.g., next few hours or next few days) future energy needs of data center 150. If near-term future energy needs are high, energy management system 280 may be more likely to successfully provide sufficient power to data center 150 if a significant amount of energy is stored within battery storage system 130 (or elsewhere within system 200). On the other hand, if near-term future energy needs are low, energy management system 280 may be likely to successfully provide sufficient power to data center 150 over the near term even if little energy is stored within battery storage system 130.

Accordingly, energy management system 280 may manage energy flows 160 based on a forecast of near-term future energy needs of data center 150. For instance, in an example that can be described with reference to FIG. 2, input device 246 detects input over connection 234 and outputs information about the input to load forecasting module 254. Load forecasting module 254 determines that the input corresponds to information about current energy utilization rates or needs of data center 150. Load forecasting module 254 accesses data store 259 and retrieves information historical energy utilization needs relating to data center 150. Load forecasting module 254 analyzes current energy utilization rates and the historical energy utilization information. Load forecasting module 254 may also analyze, where available, historical data for other data centers within system 200 or even outside system 200. Load forecasting module 254 determines, based on such information, a predicted energy utilization load that data center 150 may require in the near future. Load forecasting module 254 may make such a determination based on a number of factors included within the information, including current energy utilization, current and historical load profiles, historic trends of power usage in data center 150 and/or other data centers, energy usage patterns that may be based on time of day, day of week, type of processing being performed within data center 150, and/or other factors. Load forecasting module 254 generates an energy utilization forecast, representing the expected amount of energy that will be required to power data center 150 at some future point in time.

In some examples, to generate the energy utilization forecast, load forecasting module 254 may apply a machine learning model that has been trained using historical data stored in data store 259. Such historical data may include information about how the energy required by data center 150 has varied in the past based on time of day, day of week, and an any other factors, and/or historical data of energy utilization profiles and historic trends of data center 150 and/or other data centers. Such a machine learning model may be continually updated based on additional information about energy used by data center 150, such that the machine learning model continues to be refined by newly collected data about the energy use load of data center 150. For instance, in such an example and still referring to FIG. 2, input device 246 detects input over connection 234 and outputs information about the input to load forecasting module 254. Load forecasting module 254 determines that the input corresponds to information about the current energy load being used by data center 150. Load forecasting module 254 logs information about the current energy load in data store 259. Load forecasting module 254 compares the information about the current energy load to a previously determined forecast of the current energy load. Load forecasting module 254 adjusts the machine learning model to incorporate information about the comparison between the prior forecasted energy load and the actual load. In some examples, where the forecast was less than the actual load, load forecasting module 254 adjusts the machine learning model to increase future energy load forecasts for similar situations. Where the forecast was greater than the actual load, load forecasting module 254 may adjust the machine learning model to decrease future energy load forecasts for similar situations. Load forecasting module 254 may continue to refine the model's ability to forecast energy use by adapting to ongoing changes in how energy is used by data center 150, as reflected by information stored in data store 259.

Energy management system 280 may use the energy utilization forecast to generate information that can be used to configure or direct energy flows within system 200. For instance, in an example that can be described with reference to FIG. 2, load forecasting module 254 outputs information about an energy utilization forecast to energy flow management module 256. Energy flow management module 256 receives the energy utilization forecast and evaluates it. Energy flow management module 256 may also access or receive additional information about energy availability, and energy flow management module 256 evaluates such additional information.

Based on the information available, energy flow management module 256 generates energy flow configuration information 257, which includes information defining how energy should flow within system 200. Energy flow configuration information 257 may include information identifying one or more primary source of power for data center 150 (e.g., electrical power grid 110, power generation system 120, and/or battery storage system 130). In determining a primary source of power for data center 150, and to generate energy flow configuration information 257, energy flow management module 256 considers the capacity of electrical power grid 110, power generation system 120, battery storage system 130 and other components of system 200 to supply power. Energy flow configuration information 257 may include information about whether battery storage system 130 is to supply energy (discharge) or store energy (charge). Energy flow configuration information 257 may also include information about the rate at which battery storage system 130 should be charged or discharged. In some examples, energy flow configuration information 257 may indicate that battery storage system 130 is to be charged at a slower rate than other times, and similarly, energy flow configuration information 257 may also indicate that battery storage system 130 is to be discharged at a slower rate than other times.

Energy flow configuration information 257 may also include information about to what extent energy should be supplied to thermal energy equipment 140 to be stored as stored thermal energy 142, and whether it is appropriate to store extra energy as stored thermal energy 142.

Further, energy flow configuration information 257 may include information about whether power should be provided to electrical power grid 110 in exchange for compensation.

Energy flow management module 256 may also generate desired state of charge information 258, which describes the battery charge state that energy flow management module 256 has determined is appropriate, optimal, or preferred, given the factors considered by energy flow management module 256. In some examples, desired state of charge information 258 may describe the extent to which batteries included within battery storage system 130 are charged to capacity. Desired state of charge information 258 may correspond simply to an appropriate charge level for battery storage system 130, which might range from little or no stored energy (i.e., a "0%" battery storage level) to the maximum amount of energy that battery storage system 130 would store (i.e., a "100%" battery storage level). In other examples, desired state of charge information 258 may be represented by a range or a time sequence, indicating a desired charge percentage as a function of time. Although desired state of charge information 258 is illustrated in FIG. 2 as being separate from energy flow configuration information 257, desired state of charge information 258 may be part of and/or integrated into energy flow configuration information 257.

In some examples, energy flow configuration information 257 and desired state of charge information 258 may therefore reflect both how energy should be distributed within system 200 (e.g., sources of energy, where energy is directed), as well as how much energy is stored, and in what form (e.g., as energy stored in battery storage system 130 or as stored thermal energy 142). An appropriate set of energy flows 160, as reflected in energy flow configuration information 257, may enable system 200 to operate in an efficient, reliable, high-performance, sustainable, and/or cost-effective manner. An appropriate amount of stored energy in battery storage system 130, as represented by desired state of charge information 258, may similarly correspond to that amount of energy that enables system 200 to operate in an efficient, reliable, high-performance, sustainable, and/or cost-effective manner.

When generating desired state of charge information 258, energy flow management module 256 may also consider expected future storage needs, since, in at least some examples, battery storage system 130 is primarily where excess energy can be stored in system 100. In other words, if battery storage system 130 is charged to capacity, battery storage system 130 might not be able to store any excess energy that is available to be stored. Accordingly, as part of considering forecasted energy needs when generating desired state of charge information 258, energy flow management module 256 may also consider expected future storage needs and/or forecasted excess energy that may be produced within system 100. Where expected future energy storage needs are high, energy flow management module 256 may correspondingly generate desired state of charge information 258 to enable such energy storage to be available in battery storage system 130. Yet where expected future energy storage needs are low, energy flow management module 256 may correspondingly generate desired state of charge information 258 without reserving significant space in battery storage system 130 for energy storage.

As described, energy flow management module 256 may generate energy flow configuration information 257 and desired state of charge information 258 to optimize the reliability, performance, and efficiency of system 200 considering forecasted energy needs for data center 150. Although energy management system 280 may determine energy flow configuration information 257 and desired state of charge information 258 based solely or primarily on information about forecasted energy needs received from load forecasting module 254, energy management system 280 may alternatively, or in addition, consider other factors in determining energy flow configuration information 257. By considering other factors, in addition to forecasted energy needs for data center 150, energy management system 280 may be able to manage the distribution of energy and storage of energy within system 200 in an even more effective manner. Such other factors may include, but are not limited to, power quality information, equipment conditions, weather and news information, environmental conditions, energy market information, and/or other information.

For example, energy management system 280 may use power quality information to generate energy flow configuration information 257 and/or desired state of charge information 258. For instance, in an example that can be described in the context of FIG. 2, input device 246 detects input over connection 234 and outputs to conditions monitoring module 252 information about the input. Conditions monitoring module 252 determines that the input corresponds to information about the power quality of electrical power grid 110. In some situations, conditions monitoring module 252 may determine, based on the input, that electrical power grid 110 is providing unpredictable levels of energy (e.g., voltage spikes) that may make use of electrical power grid 110 to power data center 150 less desirable. In such a situation, conditions monitoring module 252 may determine that limiting use of electrical power grid 110 to power data center 150 may be appropriate. In other situations, conditions monitoring module 252 may determine, based on the input, that electrical power grid 110 is providing energy in an efficient or stable manner. In that situation, conditions monitoring module 252 may determine that use of electrical power grid 110 to power data center 150 may be more appropriate. Conditions monitoring module 252 outputs its determinations about power quality information to energy flow management module 256. Energy flow management module 256 may take into account the power quality information received from conditions monitoring module 252 when generating energy flow configuration information 257 and/or desired state of charge information 258.

Energy management system 280 may use information about equipment conditions to generate energy flow configuration information 257 and/or desired state of charge information 258. For instance, in another example that can be described with reference to FIG. 2, input device 246 detects input over connection 234 and outputs to conditions monitoring module 252 information about the input. Conditions monitoring module 252 determines that the information corresponds to information about one or more components of system 200. For example, conditions monitoring module 252 may determine that the information corresponds to information about the health of battery storage system 130, and whether some or all of the components of battery storage system 130 are nearing the end of their useful life, or whether aspects of battery storage system 130 have become damaged or worn. Similarly, conditions monitoring module 252 may determine that the information includes health status information relating to power generation system 120, and whether aspects of power generation system 120 are running at less than optimal efficiency or are damaged. Alternatively, conditions monitoring module 252 may determine that the information reflects that both power generation system 120 and battery storage system 130 are operating normally. Conditions monitoring module 252 may also use information about the chemistry of batteries included within battery storage system 130 to affect to what extent such batteries are charged. For instance, for certain types of batteries (e.g., lithium ion batteries), the health and longevity of such batteries may depend on how and to what extent they are charged. Conditions monitoring module 252 may generate information about battery storage system 130 that can be used to preserve the health and/or longevity of battery storage system 130. In general, conditions monitoring module 252 may determine that the information received from energy distribution system 230 may indicate information about power usage or efficiency of any component of system 200 (including components within data center 150) that might affect an appropriate determination of energy flow configuration information 257 and/or desired state of charge information 258. Conditions monitoring module 252 outputs information about equipment conditions to energy flow management module 256. Energy flow management module 256 may take into account the information about equipment conditions received from conditions monitoring module 252 when generating energy flow configuration information 257 and/or desired state of charge information 258.

Energy management system 280 may use information about weather conditions and news events to generate energy flow configuration information 257 and/or desired state of charge information 258. For instance, in another example that can be described in the context of FIG. 2, communication unit 245 detects input from information sources 170 and outputs to conditions monitoring module 252 information about the input. Conditions monitoring module 252 determines that the input corresponds to news and/or weather information. Conditions monitoring module 252 determines, based on such information, that a storm is expected in the area in which system 200 is located, or political unrest has been reported in the area in which system 200 is located. Conditions monitoring module 252 may therefore determine, based on such information, that data center 150 is likely to be powered more reliably if energy management system 280 increases the amount of energy stored within system 200. In another example, conditions monitoring module 252 may determine, based on the news and weather information, that no storms or other events are expected to adversely affect data center 150 or system 200. Conditions monitoring module 252 may therefore determine, based on that information, that a lesser level of energy stored within system 200 will likely be adequate to power data center 150. Conditions monitoring module 252 outputs information about its analysis of news and weather information to energy flow management module 256. Energy flow management module 256 may take into account the information about news and weather information received from conditions monitoring module 252 when generating energy flow configuration information 257 and/or desired state of charge information 258.

Energy management system 280 may use energy market information to generate energy flow configuration information 257 and/or desired state of charge information 258. For instance, in another example that can be described in the context of FIG. 2, communication unit 245 detects input from information sources 170 and outputs to conditions monitoring module 252 information about the input. Conditions monitoring module 252 determines that the input corresponds to energy market information, and may include information about energy costs. In some examples, such energy market information may include information about the cost of using energy from electrical power grid 110 or the price paid for exporting energy back to electrical power grid 110. In some examples, conditions monitoring module 252 may determine that energy costs are high, which may mean that limiting use of energy from electrical power grid 110 may be advantageous. High energy costs might also mean that limiting use of any energy or resources (e.g., natural gas or biogas) that might be used to power generation system 120 may be advantageous. Conditions monitoring module 252 may also determine that energy costs at certain predictable times are high, which may suggest that limiting use of such energy during those times may be advisable. Conditions monitoring module 252 may also determine, if energy costs are high, that transferring energy back to electrical power grid 110 (and receiving value in exchange), may also be beneficial and/or cost-effective. In other examples, conditions monitoring module 252 may determine that energy costs are low, making use of energy from electrical power grid 110 to be attractive relative to use of other energy sources within system 200, such as energy from power generation system 120 or energy stored within battery storage system 130. Conditions monitoring module 252 may also determine, if energy costs are low or are low at certain predictable times, that storing energy from electrical power grid 110 (and/or power generation system 120) may result in some efficiencies and/or cost savings. Conditions monitoring module 252 outputs information about its analysis of energy market information to energy flow management module 256. Energy flow management module 256 may take into account the information about energy market information received from conditions monitoring module 252 when generating energy flow configuration information 257 and/or desired state of charge information 258.

Energy management system 280 may also consider other factors in generating energy flow configuration information 257. For instance, in some examples, energy management system 280 may assess the criticality of avoiding a power failure associated with data center 150, and adjust energy flow configuration information 257 accordingly. Some data centers perform operations that might be considered more critical than others, and for data centers that are considered to be performing high-importance operations, energy flow management module 256 may tend to ensure that more energy is available as stored energy than in other situations for other data centers. Energy flow management module 256 may, in some examples, reflect such a determination by increasing the value of desired state of charge information 258 associated with battery storage system 130, which may result in battery storage system 130 storing more energy.

Also, in some examples, some customers of a data center or colocation provider might be willing to pay an additional cost to maintain a higher desired state of charge information 258 than other customers. A higher desired state of charge information 258 might result in, or might be perceived to result in, an enhanced ability for system 200 to withstand an adverse event (e.g., weather or otherwise) that might affect the ability to provide consistent power to data center 150. Yet maintaining a higher desired state of charge information 258 may have an adverse effect on the longevity of battery storage system 130, which itself might justify an additional cost being passed on to customers of a data center provider. Other changes to energy flow configuration information 257 may also be made based on customer requests and/or the nature of the operations being performed by data center 150.

Energy management system 280 may manage energy flows 160 based on energy flow configuration information 257. For instance, still referring to FIG. 3, energy flow management module 256 communicates with energy distribution system 230 over connection 232, providing control signals that are based on energy flow configuration information 257 and desired state of charge information 258. Responsive to the communication, energy distribution system 230 controls sources of energy within system 100 to power data center 150 in a manner consistent with energy flow configuration information 257. In some examples, energy flow management module 256 causes energy distribution system 230 to power data center 150 using energy solely from power generation system 120. In other examples, energy flow management module 256 causes energy distribution system 230 to power data center 150 using energy from both power generation system 120 and battery storage system 130 and/or from other sources. Energy flow management module 256 may also cause energy distribution system 230 to export power to electrical power grid 110 where appropriate.

Based on desired state of charge information 258, energy flow management module 256 may also cause energy distribution system 230 to direct energy to battery storage system 130 to thereby increase the extent to which battery storage system 130 is charged. In other examples, energy flow management module 256 may also cause energy distribution system 230 to reduce the extent to which battery storage system 130 is charged by discharging energy from battery storage system 130 to thereby power data center 150. In examples where desired state of charge information 258 represents data that corresponds to a charge level, if the current state of charge for battery storage system 130 is less than a corresponding level indicated by desired state of charge information 258, energy flow management module 256 may cause energy distribution system 230 to charge battery storage system 130. Conversely, where the current state of charge for battery storage system 130 is greater than the corresponding level indicated by desired state of charge information 258, energy flow management module 256 may cause battery storage system 130 to discharge battery storage system 130.

Energy flow management module 256 may also cause energy distribution system 230 to direct energy to thermal energy equipment 140 and store additional energy as stored thermal energy 142. In some examples, thermal energy equipment 140 may be capable of storing varying amounts of thermal energy in some cases. For example, thermal energy equipment 140 may, when cooling water for use in a liquid cooling system, cool more water than normal or cool water to an even lower-than-normal temperature, and thereby effectively store extra thermal energy. Similarly, thermal energy equipment 140 might be able to, if necessary, minimize its stored thermal energy by cooling less water or cool water to a lesser extent than normal.

Energy management system 280 may update energy flow configuration information 257 and adjust energy flows 160 accordingly. For instance, again referring to FIG. 3, input device 246 may continue to receive input from energy distribution system 230 and continue to output corresponding information about the input to load forecasting module 254. Load forecasting module 254 may determine that the information corresponds to updated energy utilization information associated with data center 150. Load forecasting module 254 may use the information to generate an updated energy utilization forecast. Load forecasting module 254 may output information about the energy utilization forecast to energy flow management module 256. In addition, communication unit 245 may continue to detect input and output information about the input to conditions monitoring module 252. Conditions monitoring module 252 may determine that the input detected by communication unit 245 corresponds to updated news, weather, or other relevant information pertaining to data center 150 or factors that may affect an ability to provide power to data center 150. Conditions monitoring module 252 may output to energy flow management module 256 information derived from the news, weather, or other relevant information.

Energy flow management module 256 may generate an updated energy flow configuration information 257, taking into account the new and/or recent information received from load forecasting module 254 and conditions monitoring module 252. Energy flow management module 256 may use updated energy flow configuration information 257 to alter energy flows 160 within system 200. In this way, energy flow management module 256 may continually, occasionally, and/or periodically continue to generate updated energy flow configuration information 257. In some examples, energy flow management module 256 may update energy flow configuration information 257 on a minute-by-minute or second-by-second basis, quickly taking into new account information soon after it is available. By quickly acting on new information as it is available, energy management system 280 may be able to provide enhanced reliability and preparedness for any events that could threaten an ability for system 200 to consistently provide adequate power to data center 150.

Modules illustrated in FIG. 2 (e.g., conditions monitoring module 252, load forecasting module 254, and energy flow management module 256) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Figure 3:
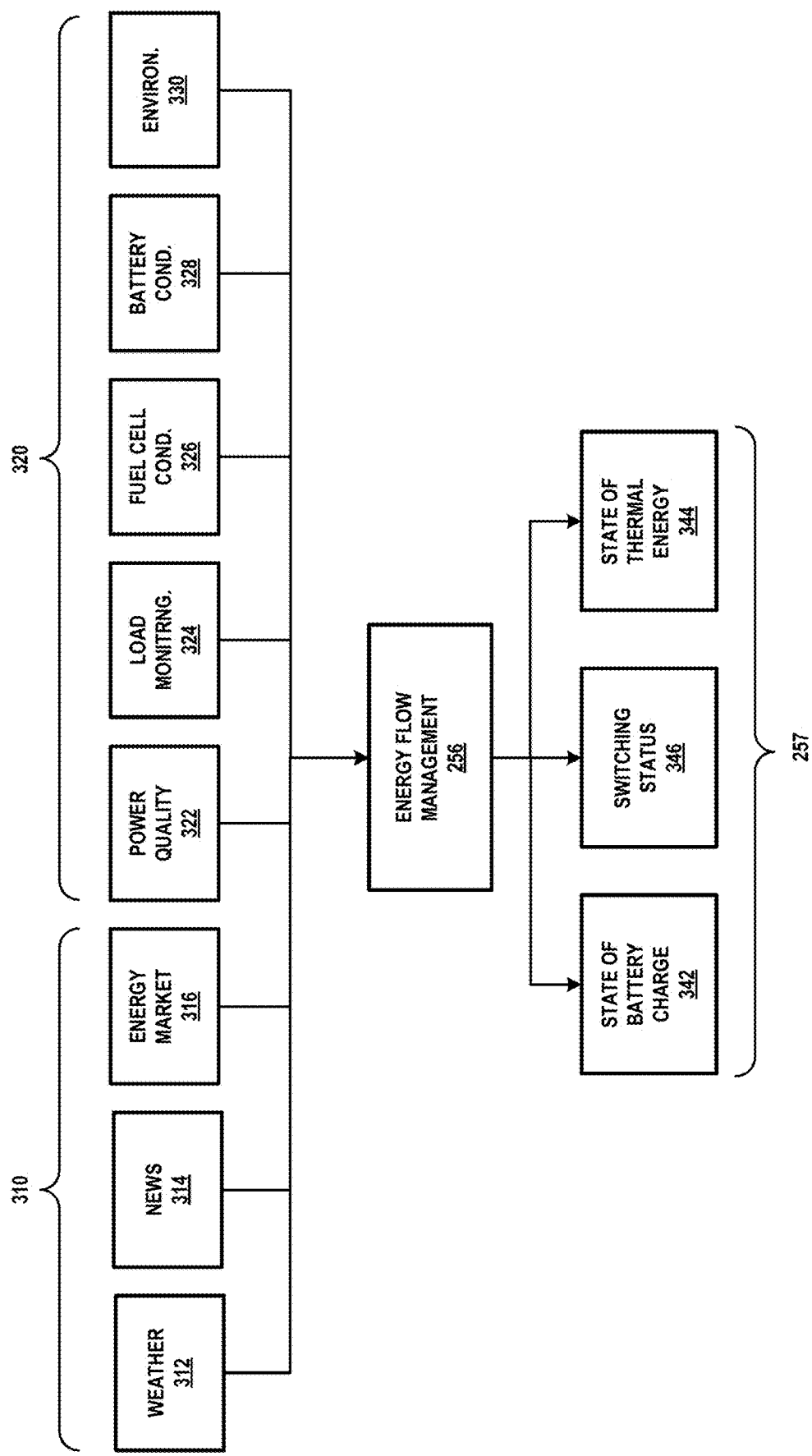
FIG. 3 is a conceptual diagram illustrating factors that may be considered by an example energy flow management module when generating energy flow configuration information, in accordance with one or more aspects of the present disclosure.

FIG. 3 is a conceptual diagram illustrating factors that may be considered by energy flow management module 256 when generating energy flow configuration information 257, in accordance with one or more aspects of the present disclosure. In the example of FIG. 3, energy flow management module 256 considers both regional information 310 and local information 320 to generate energy flow configuration information 257. The resulting energy flow configuration information 257, generated by energy flow management module 256, may include state of battery charge 342, switching status 346, and information pertaining to state of thermal energy 344.

Regional information 310 includes weather information 312, news information 314, and energy market information 316. As described in connection with FIG. 2, weather and news information can provide an indication of future events that can adversely affect an ability for systems to provide adequate power to keep data center 150 operational. Energy flow management module 256 considers such information and adjusts energy flow configuration information 257 as appropriate. Preferably, energy flow management module 256 adjusts energy flow configuration information 257 in order to increase the chances of data center 150 remaining operational through any upcoming weather storm or other adverse event. Energy flow management module 256 may also consider energy market information 316, since operating data center 150 in a cost-effective and reliable manner may involve considering energy costs, which may be included in energy market information 316.

In the example of FIG. 3, local information 320 includes power quality information 322, load monitoring information 324, power generation system conditions 326, battery storage system conditions 328, and environmental information 330. As described in connection with FIG. 2, information relating to local conditions such as power quality, load monitoring, fuel cell conditions, and battery conditions may affect how energy flow configuration information 257 should be properly and effectively determined. Information about environmental conditions, such as the air temperature in the data center or the air temperature outside the building that houses the data center may also be considered by energy flow management module 256.

Using the factors illustrated in the example of FIG. 3, energy flow management module 256 generates energy flow configuration information 257. As shown in FIG. 3, energy flow configuration information 257 may include state of battery charge information 342, which may correspond to desired state of charge information 258 described in connection with FIG. 2. Energy flow configuration information 257 may also include switching status information 346, which may describe the energy flows to and from electrical power grid 110, power generation system 120, and/or battery storage system 130. For instance, if electrical power grid 110 is not used to provide power to data center 150, switching status information 346 may indicate that the switch enabling power to flow from electrical power grid 110 to data center 150 be turned off. Energy flow configuration information 257 may also include state of thermal energy information 344, which may describe to what extent energy should be stored as stored thermal energy 142, and whether excess thermal energy should be stored (e.g., as excess cooled water, or as water cooled to a lower temperature than normal).

Figure 4:
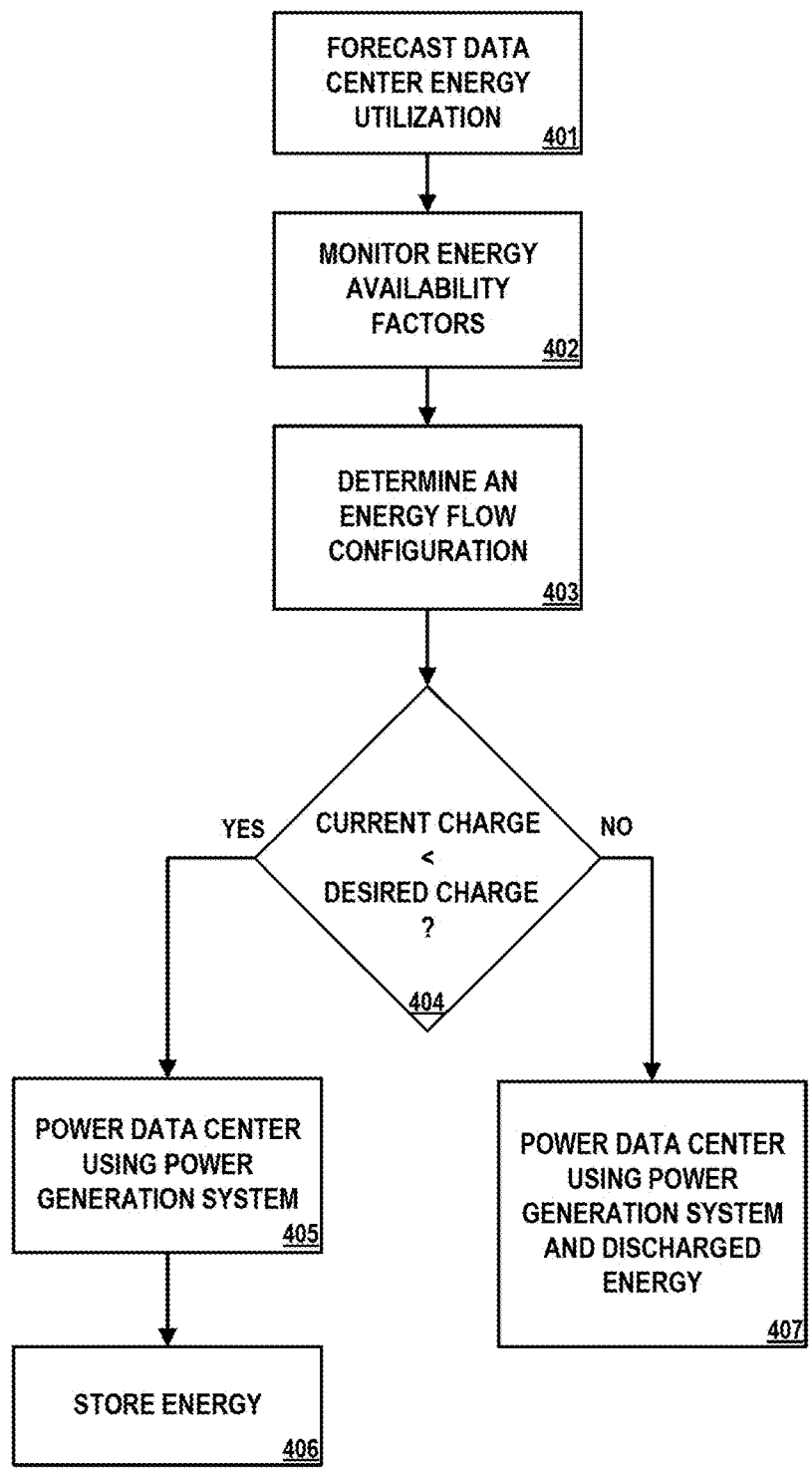
FIG. 4 is a flow diagram illustrating operations performed by an example energy management system in accordance with one or more aspects of the present disclosure.

FIG. 4 is a flow diagram illustrating operations performed by an example energy management system in accordance with one or more aspects of the present disclosure. FIG. 4 is described within the context of energy management system 280 of FIG. 2. In other examples, operations described in FIG. 4 may be performed by one or more other components, modules, systems, or devices. Further, in other examples, operations described in connection with FIG. 4 may be merged, performed in a difference sequence, omitted, or may encompass additional operations not specifically illustrated or described.

In the process illustrated in FIG. 4, and in accordance with one or more aspects of the present disclosure, energy management system 280 may forecast data center energy utilization (401). For instance, with reference to FIG. 2, and in some examples, load forecasting module 254 analyzes information about the current operation of data center 150, and the current energy utilization of data center 150. Load forecasting module 254 also accesses data store 259 for information about the historical energy needs of data center 150. Based on this information, load forecasting module 254 determines an energy utilization forecast, indicating energy needs required by data center 150 for a point in time in the near future.

Energy management system 280 may monitor energy availability factors (402). For instance, again referring to FIG. 2, and in some examples, input device 246 detects input and outputs to conditions monitoring module 252 information about various conditions associated with data center 150 and available power sources for data center 150. Such conditions may include information about the quality of power provided by electrical power grid 110 or the condition of the batteries included within battery storage system 130 (e.g., battery wear level information associated with battery storage system 130). Further, communication unit 245 detects input and outputs to conditions monitoring module 252 information about weather and news events. Conditions monitoring module 252 monitors and considers these items of information, each of which may have some effect on energy availability as it pertains to data center 150.

Energy management system 280 may determine an energy flow configuration (403). For instance, still referring to FIG. 3, load forecasting module 254 outputs its energy utilization forecast to energy flow management module 256. Conditions monitoring module 252 outputs information about the monitored energy availability factors to energy flow management module 256. Energy flow management module 256 determines, based on the energy utilization forecast and the monitored energy availability factors, energy flow configuration information 257. In some examples, energy flow configuration information 257 includes information about optimal or desired energy flows 160 within system 200. Energy flow configuration information 257 may include information about a desired state of charge (e.g., desired state of charge information 258) for one or more batteries included within battery storage system 130. In general, energy flow configuration information 257 may include, but might not necessarily be limited to, state of battery charge information 342, switching status information 346, and state of thermal energy information 344, as described in connection with FIG. 3.

Energy management system 280 may determine that the current charge state for one or more batteries within battery storage system 130 is less than the desired charge state indicated by energy flow configuration information 257 (YES path from 404). For instance, in some examples, input device 246 detects input from energy distribution system 230. Input device 246 outputs information about the input to energy flow management module 256. Energy flow management module 256 determines that the input identifies the current state of charge for battery storage system 130. Energy flow management module 256 determines that the current state of charge for battery storage system 130 is less than that indicated by desired state of charge information 258, which may be included within energy flow configuration information 257. Energy flow management module 256 communicates with energy distribution system 230 over connection 232. Responsive to the communication, energy distribution system 230 causes energy generated by power generation system 120 to be used to power data center 150 (405). Energy distribution system 230 further causes any excess energy generated by power generation system 120 to be directed to battery storage system 130, thereby storing energy in battery storage system 130 (406).

Energy management system 280 may determine that the current charge state of battery storage system 130 is greater than the desired charge state indicated by energy flow configuration information 257 (NO path from 404). For instance, in some examples, energy flow management module 256 determines that the current state of charge (derived from input received from input device 246) is greater than that indicated by desired state of charge information 258. Energy flow management module 256 communicates with energy distribution system 230 over connection 232. Responsive to the communication, energy distribution system 230 causes data center 150 to be powered by both energy generated by power generation system 120 and energy discharged from battery storage system 130 (407).

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

For ease of illustration, only a limited number of devices (e.g., power generation system 120, battery storage system 130, thermal energy equipment 140, data center 150, data center devices 156, energy management system 180, energy management system 280, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated in the Figures herein (e.g., FIG. 1 and/or FIG. 2) as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A system comprising:
a power generation system for powering a data center, wherein the power generation system is chosen to be sufficient to meet normal energy needs of all systems within the data center, but insufficient to meet peak energy needs of the data center, and wherein the power generation system operates more efficiently when used at peak capacity than at less than peak capacity of the power generation system;
a battery storage system having a state of charge attribute; and
processing circuitry having access to an electrical power grid, the power generation system, and the battery storage system, wherein the processing circuitry is configured to:
determine an energy utilization forecast for the data center,
monitor energy availability factors,
determine, based on the energy utilization forecast and the monitored energy availability factors, an energy flow configuration defining energy flows involving the electrical power grid, the power generation system, the battery storage system, and the data center, wherein the energy flow configuration includes information identifying the power generation system as a primary source of power for the data center with the power generation system used at peak capacity, and wherein the energy flow configuration mandates that the data center is not to be powered by the electrical power grid even when power from the electrical power grid is available,
provide power to the data center based on the energy flow configuration, and
manage energy flows involving the battery storage system based on the energy flow configuration, wherein to manage the energy flows, the processing circuitry meets peak energy needs of the data center by using power from both the power generation system and the battery storage system.

2. The system of claim 1, wherein the power generation system generates electrical power by converting at least one of natural gas or biogas into electricity.

3. The system of claim 1, wherein the battery storage system includes a plurality of lithium ion batteries.

4. The system of claim 1, wherein to determine an energy utilization forecast, the processing circuitry is further configured to:
collect energy utilization information relating to current energy utilization by the data center; and
apply a machine learning model to the energy utilization information to determine the energy utilization forecast, wherein the machine learning model has been trained with historical information about energy utilization by the data center.

5. The system of claim 1, wherein the energy flow configuration includes a desired state of charge value, and wherein to manage the energy flows involving the battery storage system, the processing circuitry is further configured to:
manage the energy flows involving the battery storage system by directing energy to the battery storage system to charge the battery storage system when the desired state of charge value is greater than the state of charge attribute.

6. The system of claim 1, wherein the energy flow configuration includes a desired state of charge value, and wherein to manage the energy flows involving the battery storage system, the processing circuitry is further configured to:
manage the energy flows involving the battery storage system by providing energy to the data center by discharging energy from the battery storage system when the desired state of charge value is less than the state of charge attribute.

7. The system of claim 1, wherein the energy availability factors include one or more of commercial information, environmental information, local monitoring information, power quality information, equipment condition information, weather conditions information, information about news events, information about energy markets, or information about energy costs.

8. The system of claim 1, wherein the processing circuitry is further configured to:
determine an updated energy utilization forecast for the data center;
continue to monitor the energy availability factors;
determine, based on the updated energy utilization forecast and the monitored energy availability factors, an updated energy flow configuration;
provide power to the data center based on the updated energy flow configuration; and
manage energy flows involving the battery storage system based on the updated energy flow configuration.

9. The system of claim 1,
wherein the energy flow configuration indicates that the data center is to be powered solely by the power generation system used at the peak capacity of the power generation system, and
wherein the energy flow configuration indicates that power generated by the power generation system that exceeds the needs of the data center is to be used to charge the battery storage system.

10. The system of claim 1, wherein the energy flow configuration indicates that the data center is to be powered by a combination of the power generation system and the battery storage system.

11. The system of claim 1, wherein the energy flow configuration further defines energy flows associated with stored thermal energy, and wherein the processing circuitry is further configured to:
manage energy flows involving the stored thermal energy based on the energy flow configuration by cooling water associated with a liquid cooling system.

12. The system of claim 8, wherein the updated energy flow configuration indicates that for at least a time period the data center is to be powered solely by one of the electrical power grid, the power generation system, or the battery storage system.

13. A computing system configured to:
determine an energy utilization forecast for a data center that includes a power generation system designed to be sufficient to meet normal energy needs of all systems within the data center, but insufficient to meet peak energy needs of the data center, and wherein the power generation system operates more efficiently when used at peak capacity than at less than peak capacity of the power generation system;

monitor energy availability factors;

determine, based on the energy utilization forecast and the monitored energy availability factors, an energy flow configuration defining energy flows involving an electrical power grid, the power generation system, a battery storage system, and the data center, wherein the energy flow configuration includes information identifying the power generation system as a primary source of power for the data center with the power generation system used at peak capacity, and wherein the energy flow configuration mandates that the data center is not to be powered by the electrical power grid even when power from the electrical power grid is available;

provide power to the data center based on the energy flow configuration; and manage energy flows involving the battery storage system based on the energy flow configuration, wherein to manage the energy flows, the computing system meets peak energy needs of the data center by using power from both the power generation system and the battery storage system.

14. A method comprising:

determining, by an energy management system, an energy utilization forecast for a data center that includes a power generation system sized to be sufficient to meet normal energy needs of all systems within the data center, but insufficient to meet peak energy needs of the data center, and wherein the power generation system operates more efficiently when used at peak capacity than at less than peak capacity of the power generation system;

monitoring, by the energy management system, energy availability factors;

determining, by the energy management system and based on the energy utilization forecast and the monitored energy availability factors, an energy flow configuration defining energy flows involving with an electrical power grid, the power generation system, a battery storage system, and the data center, wherein the energy flow configuration includes information identifying the power generation system as a primary source of power for the data center with the power generation system used at peak capacity, and wherein the energy flow configuration mandates that the data center is not to be powered by the electrical power grid even when power from the electrical power grid is available;

providing, by the energy management system, power to the data center based on the energy flow configuration; and managing, by the energy management system, energy flows involving the battery storage system based on the energy flow configuration, wherein managing energy flows includes meeting peak energy needs of the data center by using power from both the power generation system and the battery storage system.

15. The method of claim 14, wherein determining an energy utilization forecast includes:

collecting energy utilization information relating to current energy utilization by the data center; and applying a machine learning model to the energy utilization information to determine the energy utilization forecast, wherein the machine learning model has been trained with historical information about energy utilization by the data center.

16. The method of claim 14, wherein the energy flow configuration includes a desired state of charge value, and managing the energy flows involving the battery storage system includes:

managing the energy flows involving the battery storage system by directing energy to the battery storage system to charge the battery storage system when the desired state of charge value is greater than a state of charge attribute.

17. The method of claim 14, wherein the energy flow configuration includes a desired state of charge value, and wherein managing the energy flows involving the battery storage system includes:

managing the energy flows involving the battery storage system by providing energy to the data center by discharging energy from the battery storage system when the desired state of charge value is less than a state of charge attribute.

18. The method of claim 14, wherein the energy availability factors include one or more of commercial information, environmental information, local monitoring information, power quality information, equipment condition information, weather conditions information, information about news events, information about energy markets, or information about energy costs.

19. A non-transitory computer-readable storage medium comprising instructions that, when executed, configure processing circuitry of a computing system to:

determine an energy utilization forecast for a data center that includes a power generation system sized to be sufficient to meet normal energy needs of all systems within the data center, but insufficient to meet peak energy needs of the data center, and wherein the power generation system operates more efficiently when used at peak capacity than at less than peak capacity of the power generation system;

monitor energy availability factors;

determine, based on the energy utilization forecast and the monitored energy availability factors, an energy flow configuration defining energy flows involving an electrical power grid, the power generation system, a battery storage system, and the data center, wherein the energy flow configuration includes information identifying the power generation system as a primary source of power for the data center with the power generation system used at peak capacity, and wherein the energy flow configuration mandates that the data center is not to be powered by the electrical power grid even when power from the electrical power grid is available;

provide power to the data center based on the energy flow configuration; and manage energy flows involving the battery storage system based on the energy flow configuration, wherein managing energy flows includes meeting peak energy needs of the data center by using power from both the power generation system and the battery storage system.

* * * * *